INVENTOR.
FREDERICK W. KULICKE, JR.;
GLENDON H. SCHWALM;
ROBERT ULLMAN
BY:
Curtis, Morris & Safford

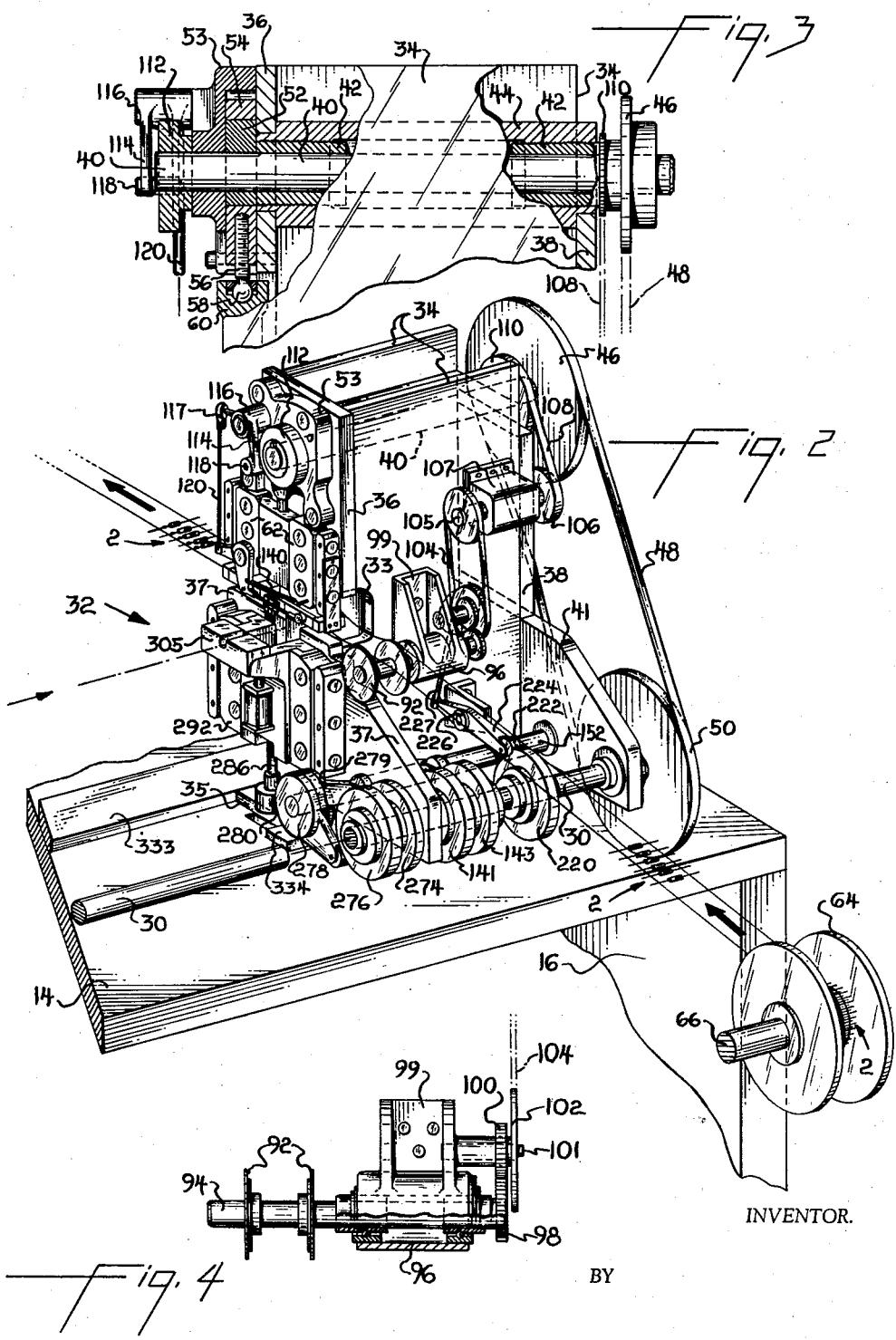

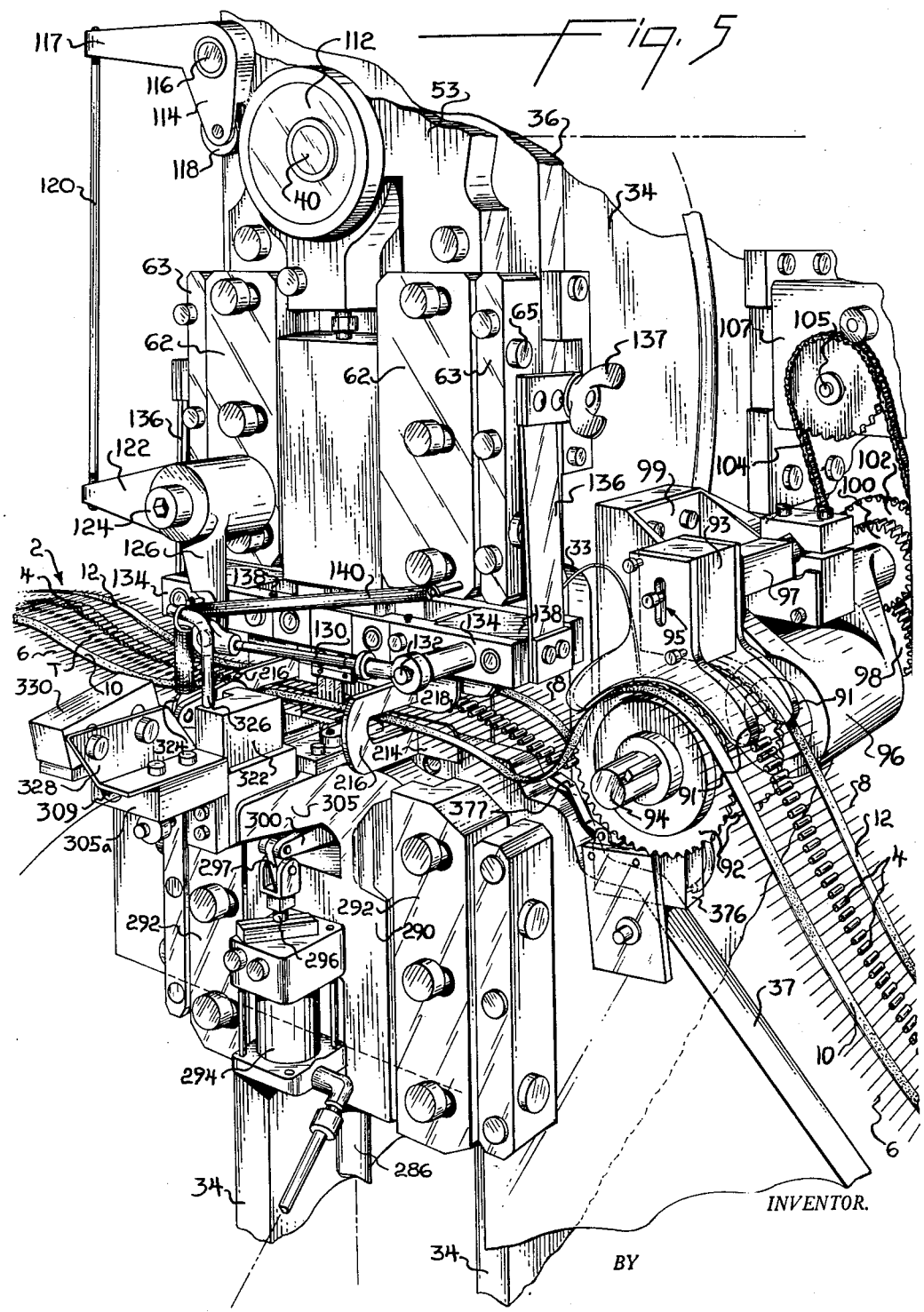

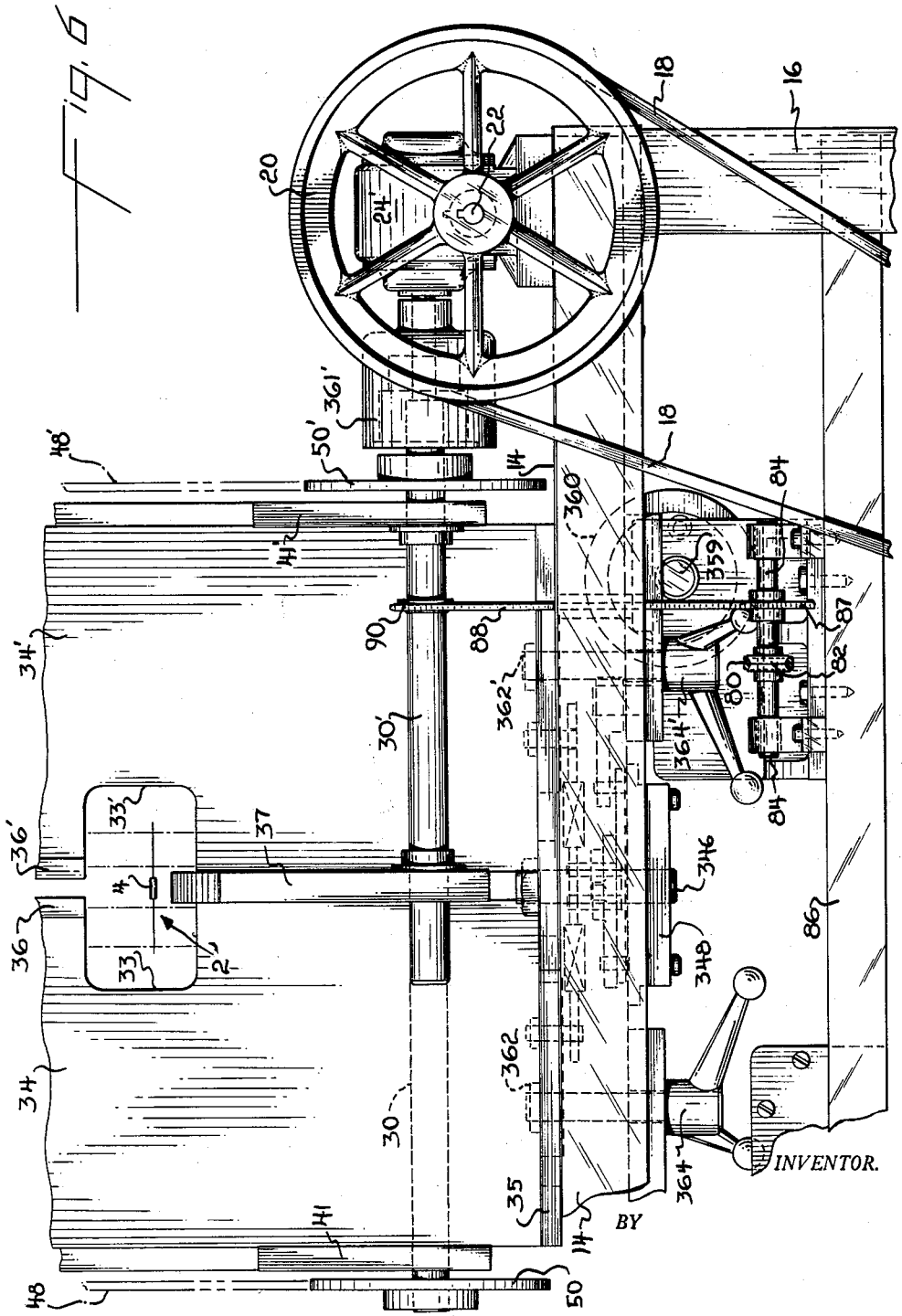

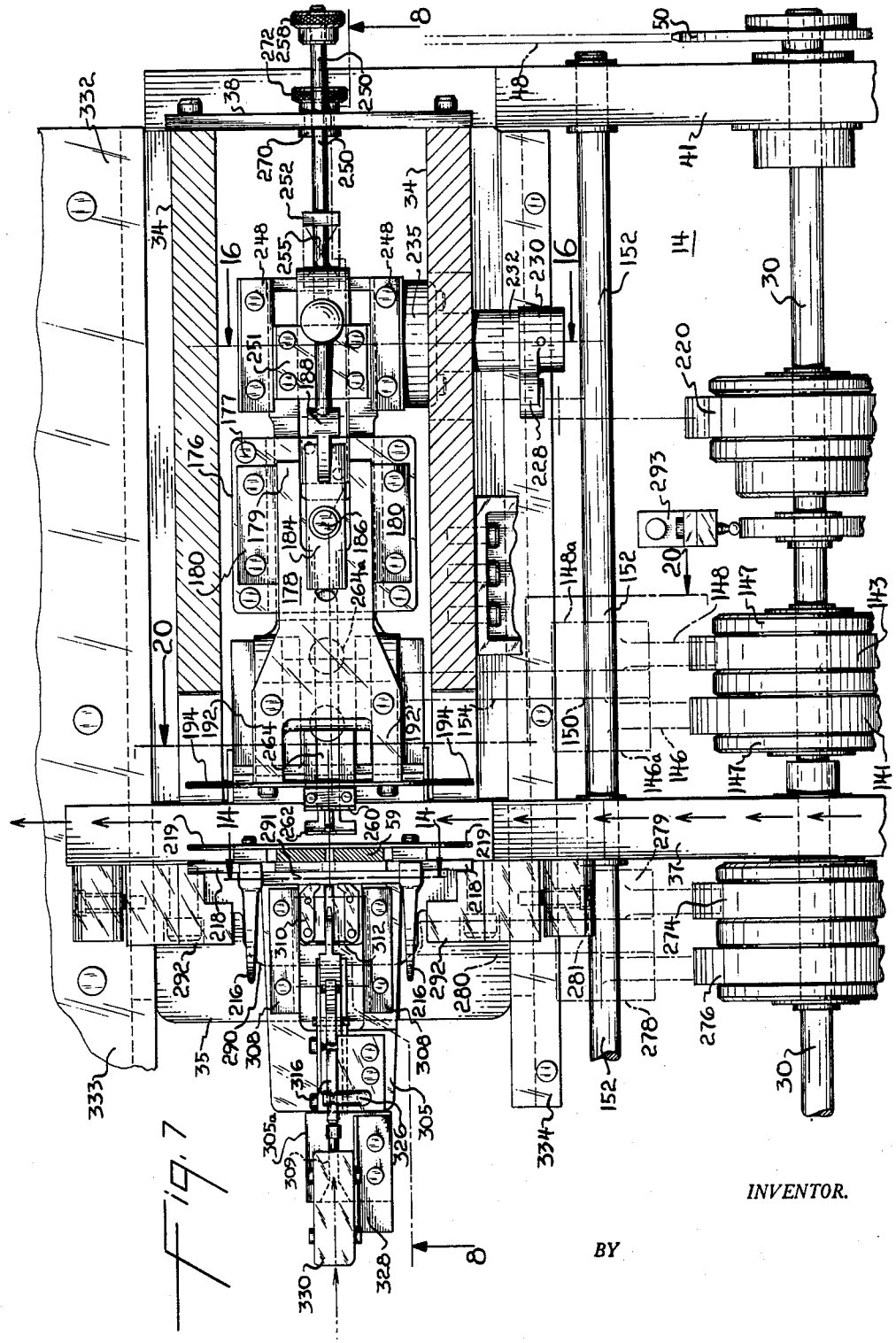

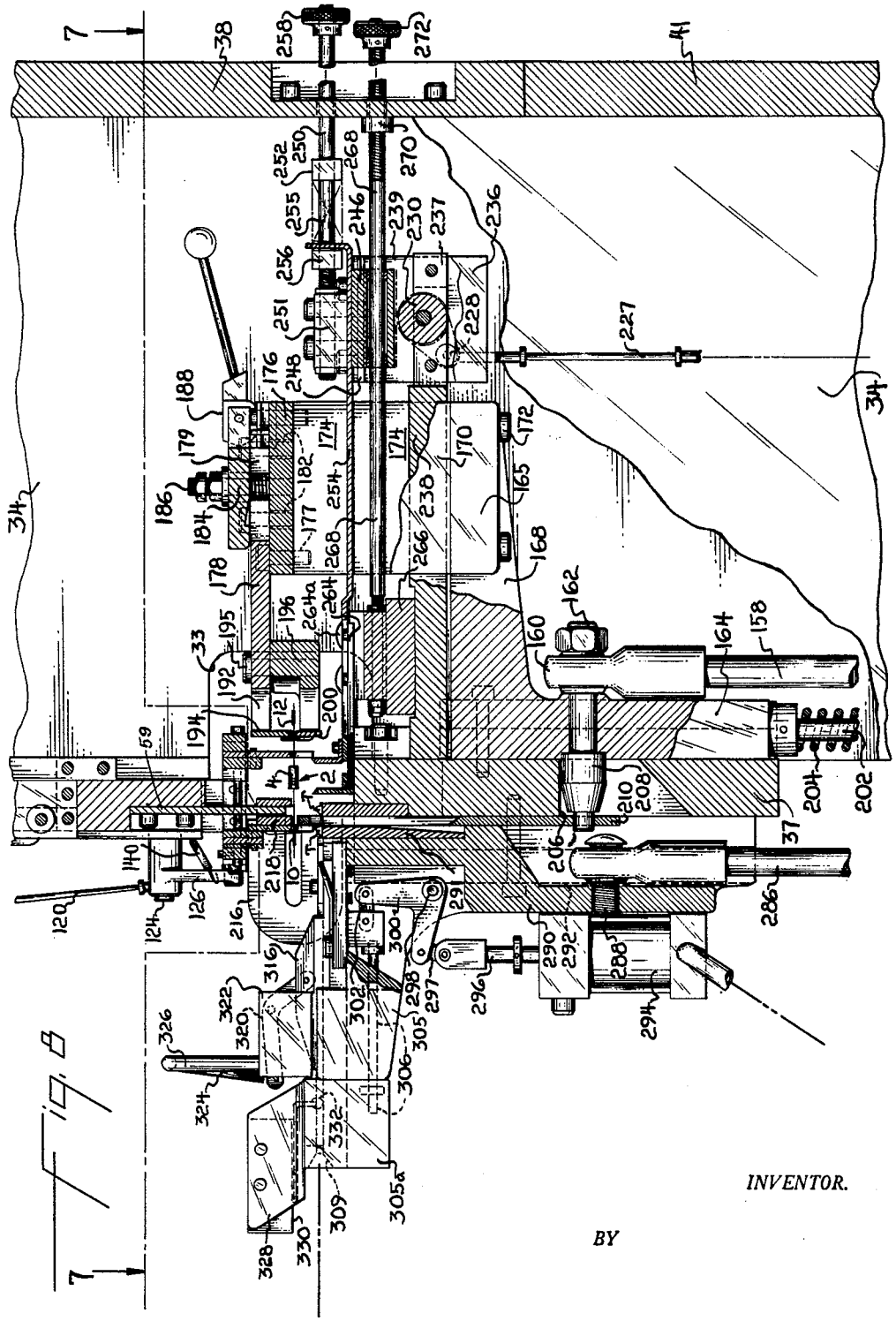

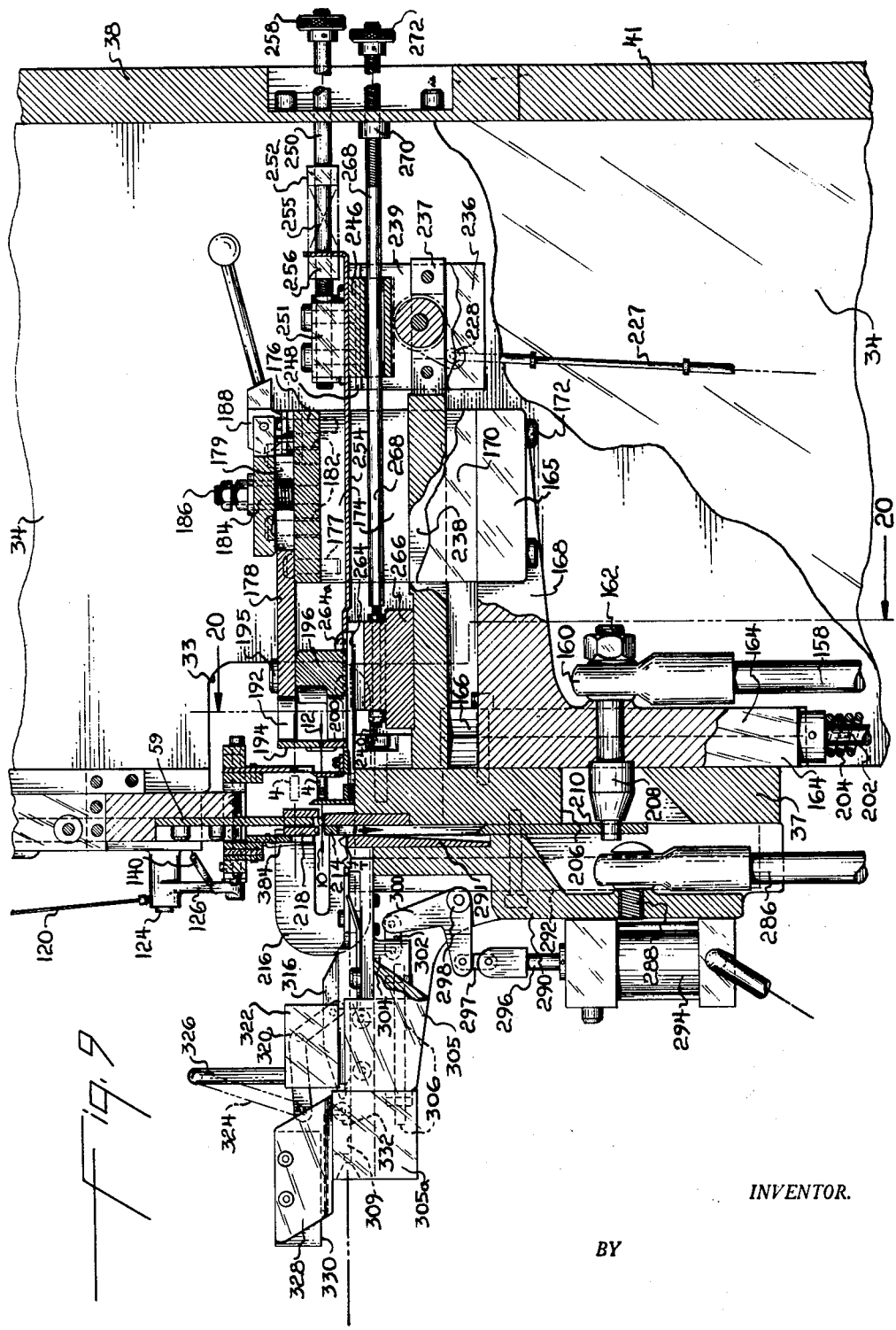

Nov. 3, 1964   F. W. KULICKE, JR., ET AL   3,155,138
ASSEMBLING AND CRIMPING APPARATUS
Original Filed Jan. 13, 1958   15 Sheets-Sheet 8

INVENTOR.
BY

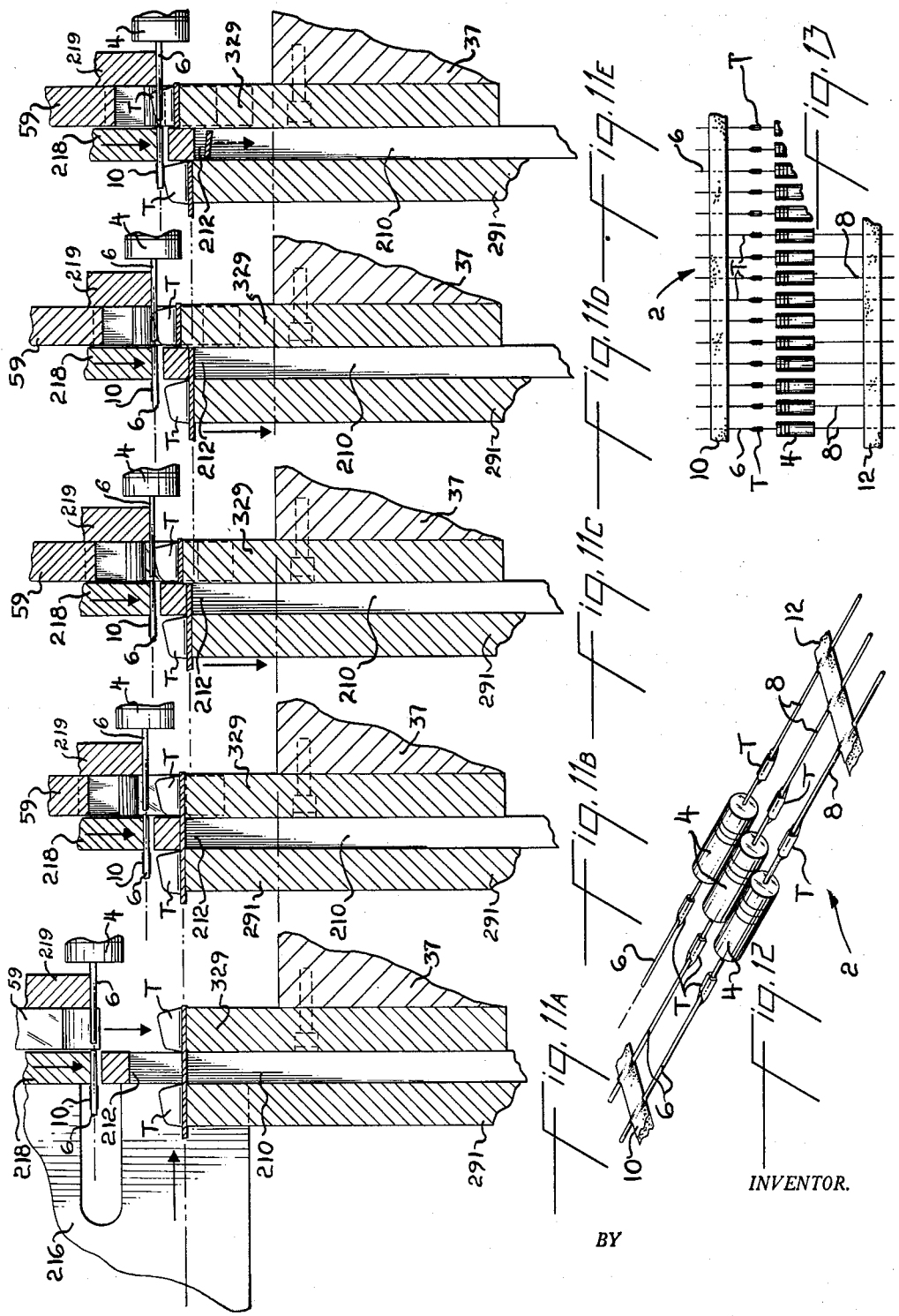

Nov. 3, 1964   F. W. KULICKE, JR., ETAL   3,155,138
ASSEMBLING AND CRIMPING APPARATUS
Original Filed Jan. 13, 1958                    15 Sheets-Sheet 10
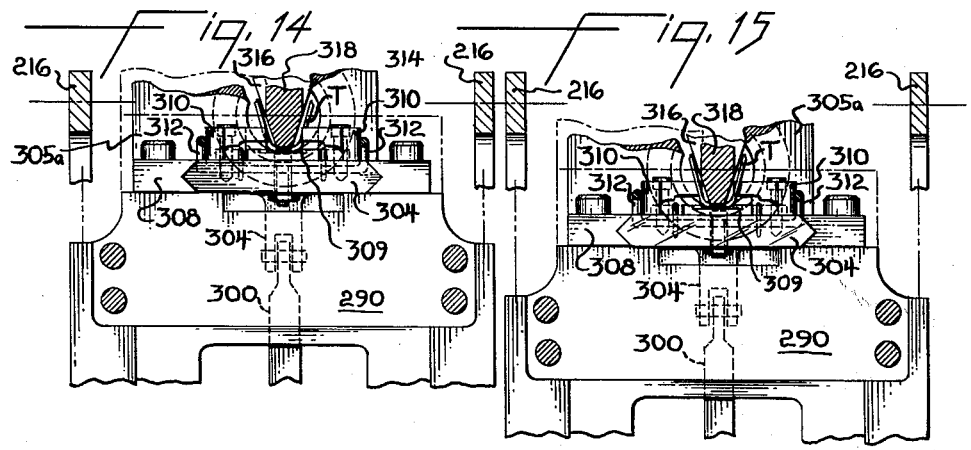
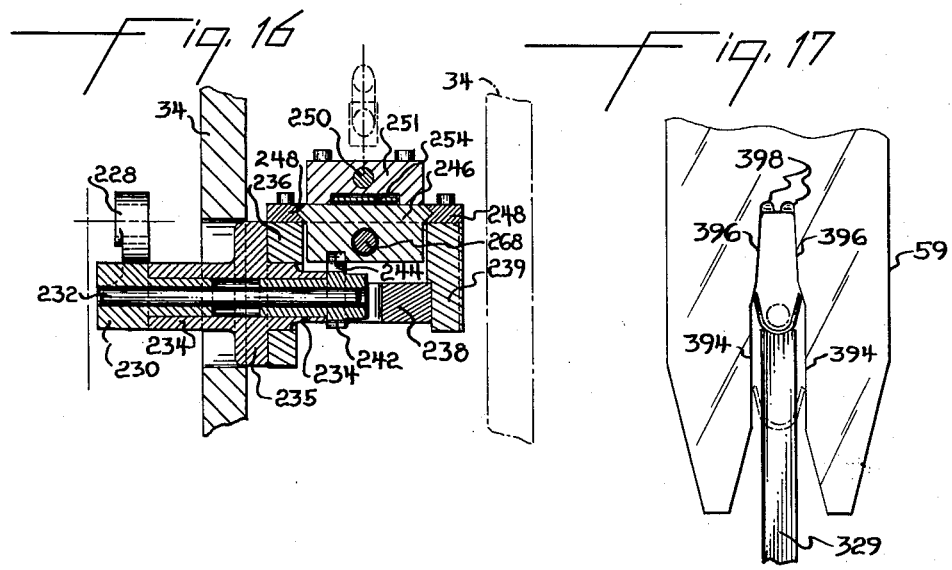
INVENTOR.
BY

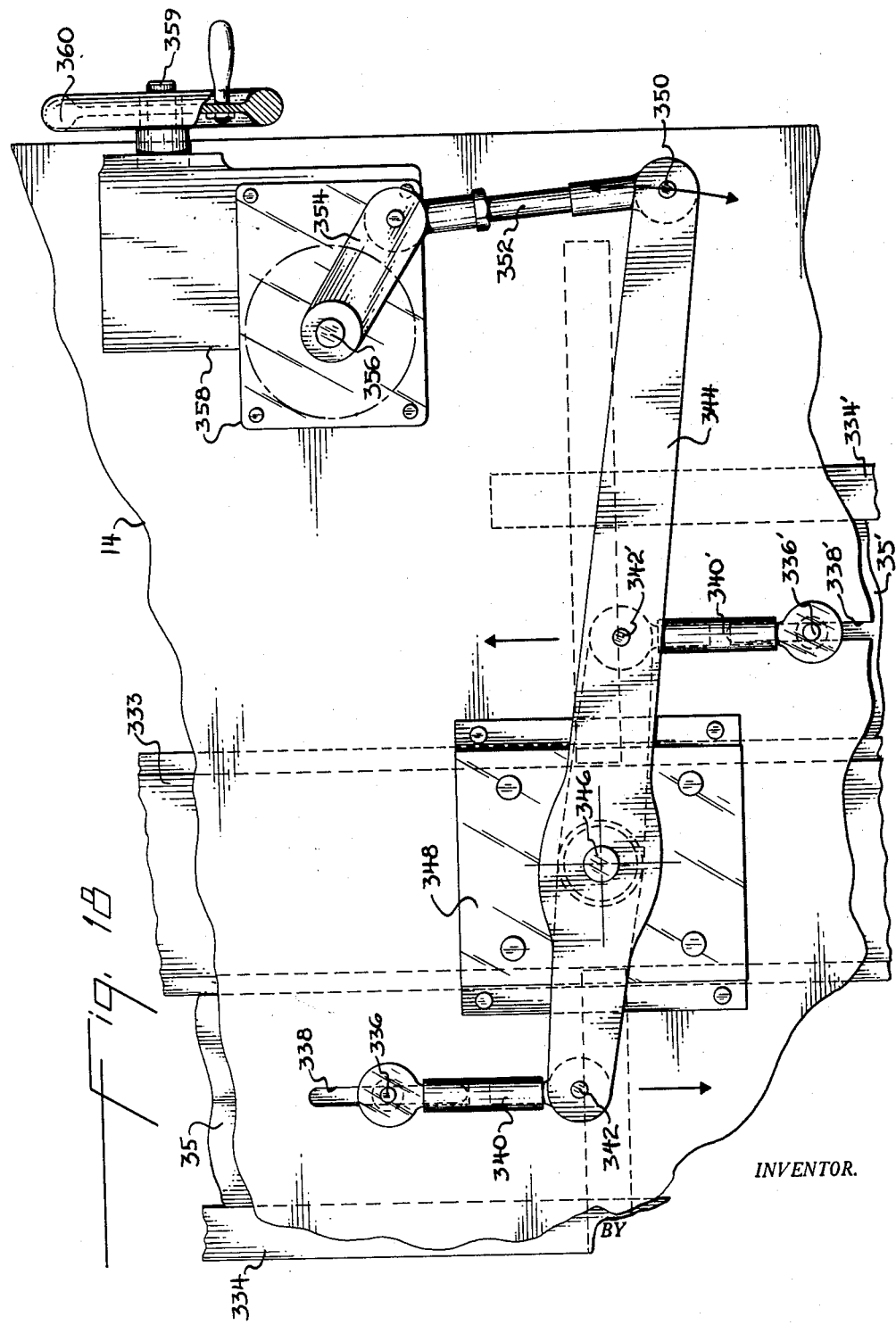

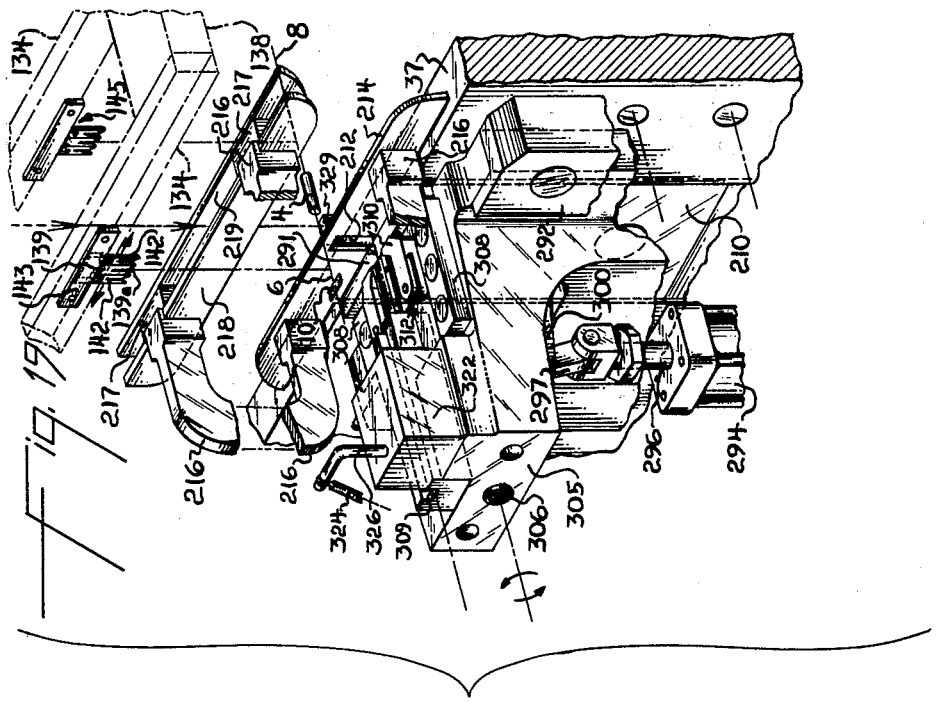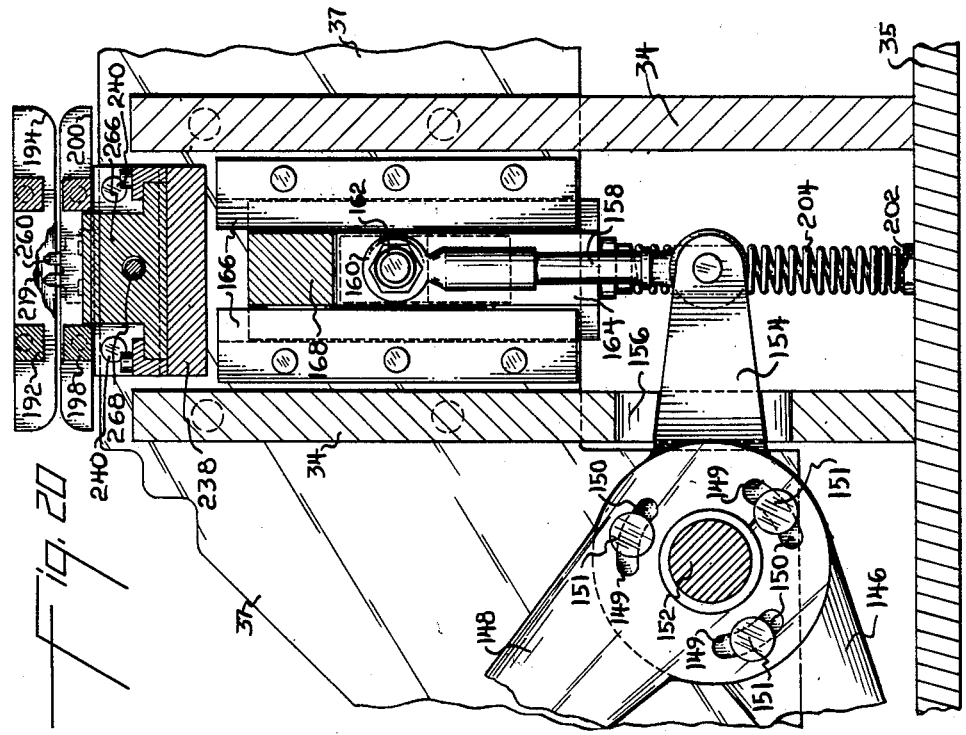

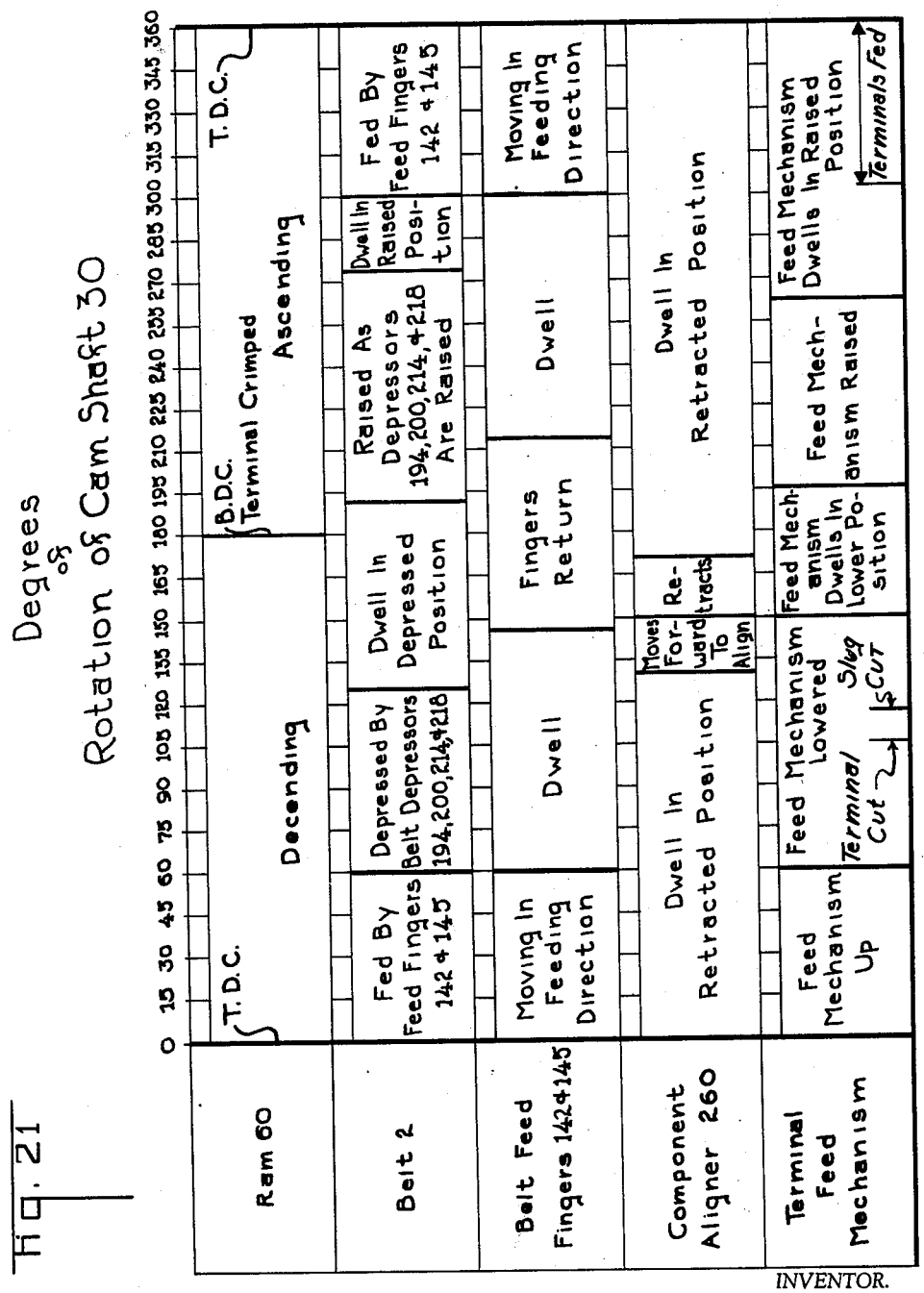

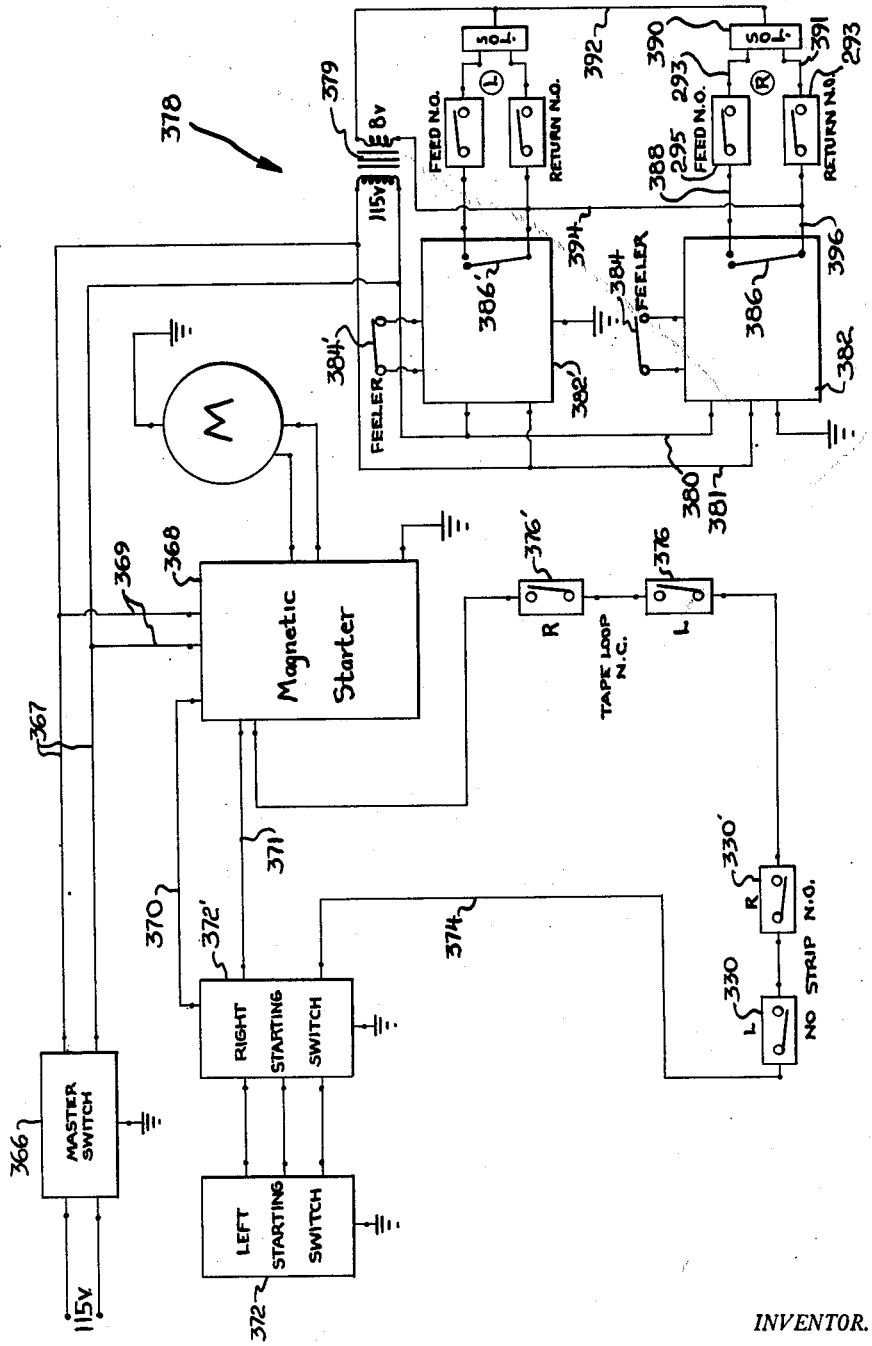

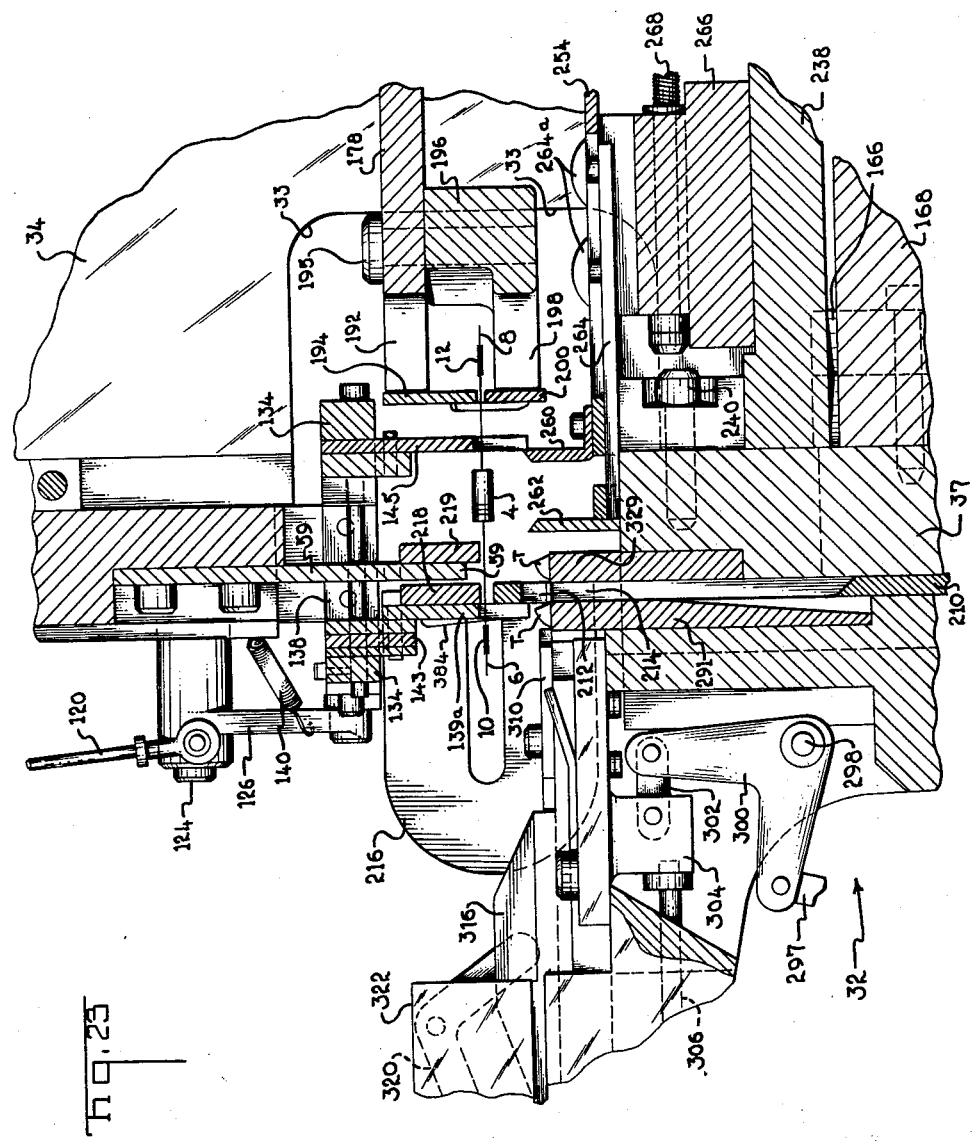

United States Patent Office 3,155,138
Patented Nov. 3, 1964

3,155,138
ASSEMBLING AND CRIMPING APPARATUS
Frederick W. Kulicke, Jr., Philadelphia, and Glendon H. Schwalm and Robert Ullman, Harrisburg, Pa., assignors to AMP Incorporated, Harrisburg, Pa.
Continuation of application Ser. No. 708,602, Jan. 13, 1958. This application July 20, 1962, Ser. No. 215,232
6 Claims. (Cl. 153—1)

This invention relates to apparatus for applying electrical terminals or connectors to electrical devices such as condensers, resistors, fuses, transistors and the like. The invention is herein disclosed with particular reference to the assembling of terminals to wires extending from resistors but is adaptable to usage with other electrical components or devices.

In the manufacture of electronic equipment by mass production methods, the need arises for large numbers of components having suitable terminals or connectors secured thereto. Where printed circuit boards are used, for example, and components such as resistors or transistors having wires extending therefrom are employed, a terminal is crimped onto the wires and the terminals are inserted into the boards. The components are usually, if not always, supplied in loose-piece form and the assembly of the terminals to the components, or component wires is a relatively delicate operation since the component itself must not be damaged in the process. Furthermore, the operation of applying the terminal must be carried out rapidly and at low expense because of the vast numbers of pieces required.

Our present invention provides an apparatus by means of which terminals can be applied automatically and at an extremely rapid rate. In accordance with a preferred embodiment of the invention, the components are carried by a conveyor past a crimping station or a pair of crimping stations (where two wires extend from the component) where terminals are crimped onto the wires. The conveyor may be an ordinary endless conveyor on which the components are loaded at one station and from which they are unloaded at another station. Advantageously, and in our preferred embodiment, however, the components are secured together in spaced side-by-side relationship by belting which is fed through the apparatus from a supply reel and wound upon a take-up reel after the terminals have been applied. The belting thus functions as a conveyor while the components are being fed through the apparatus, and the components having terminals crimped thereto are supplied from the machine in the convenient form of being secured together by tape which permits compact and safe storage.

Our preferred apparatus embodiment provides a means for feeding the belting intermittently through the machine and positioning each component successively at the crimping station or stations. The terminals are fed successively and automatically to the crimping station and the belting is moved laterally of its plane to position the component wire within the uncrimped terminal. The feeding mechanism for the terminals is reciprocably mounted and, during movement of the belt towards the terminal, moves away from the crimping station so that it will not interfere with the crimping operation. Another salient feature of the invention is a means for aligning and positioning accurately each component prior to crimping so that the terminals are positioned accurately on the component wires.

Other objects and attainments of the present invention will become apparent to those skilled in the art upon a reading of the following detailed description when taken in conjunction with the drawings in which there is shown and described an illustrative embodiment of the invention; it is to be understood, however, that this embodiment is not intended to be exhaustive nor limiting of the invention but is given for purposes of illustration in order that others skilled in the art may fully understand the invention and the principles thereof and the manner of applying it in practical use so that they may modify it in various forms, each as may be best suited to the conditions of a particular use.

In the drawings:

FIGURE 1 is a top plan view of a preferred embodiment of the invention;

FIGURE 2 is a fragmentary perspective view, looking in the direction of the arrows 2—2 of FIGURE 1, showing one of the crimping presses and various associated mechanisms such as the belt feed mechanism, the belt pulling mechanism, and the cam shaft by means of which the belt is manipulated and the terminals are fed, the terminal feed mechanism having been omitted from this view in the interest of clarity;

FIGURE 3 is a fragmentary side view showing the top portion of the crimping press;

FIGURE 4 is a plan view of the belt pulling mechanism;

FIGURE 5 is a perspective view similar to FIGURE 2 but on an enlarged scale and showing only the central portion of the press, the associated terminal feed mechanism, and the belt feed and belt pulling mechanisms;

FIGURE 6 is a fragmentary end view taken along the line and looking in the direction of the arrows 6—6 of FIGURE 1;

FIGURE 7 is a view taken along the line and looking in the direction of the arrows 7—7 of FIGURE 8;

FIGURE 8 is a view taken along the line and looking in the direction of the arrows 8—8 of FIGURE 7. This view shows in elevation the component aligning mechanism, the belt guiding mechanism, and the terminal feeding mechanism;

FIGURE 9 is a view similar to FIGURE 8 but showing the parts in the positions they occupy when the component is lowered into a fed terminal;

Figure 1:
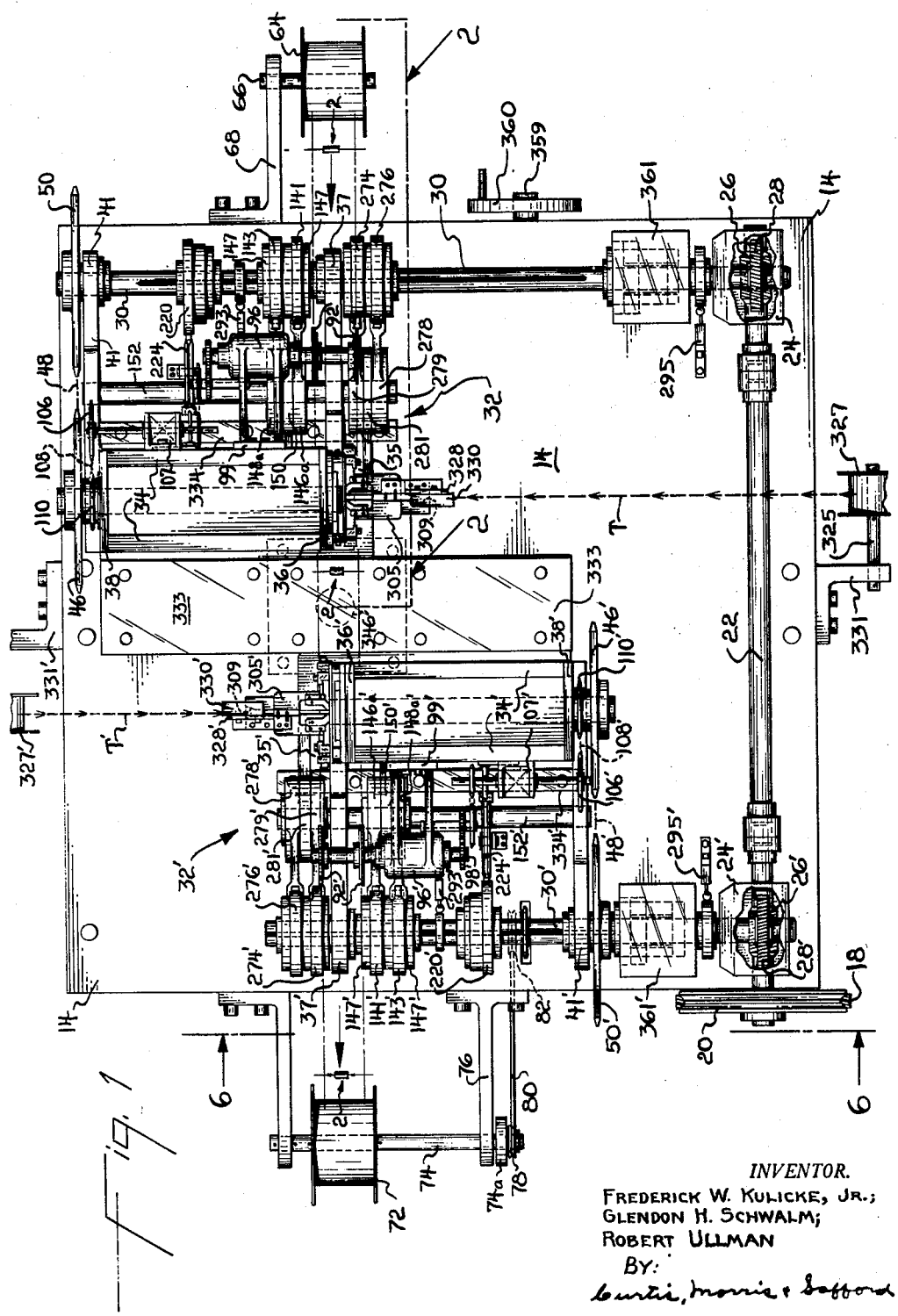
Figure 10A:
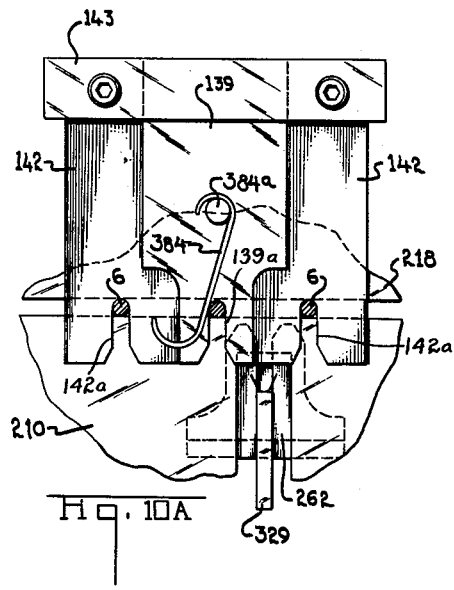
Figure 10B:
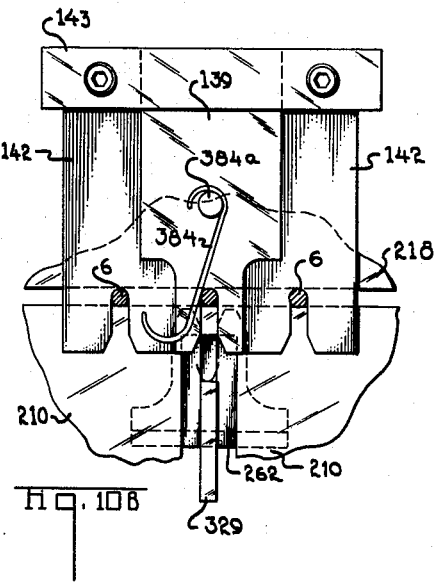
Figure 10C:
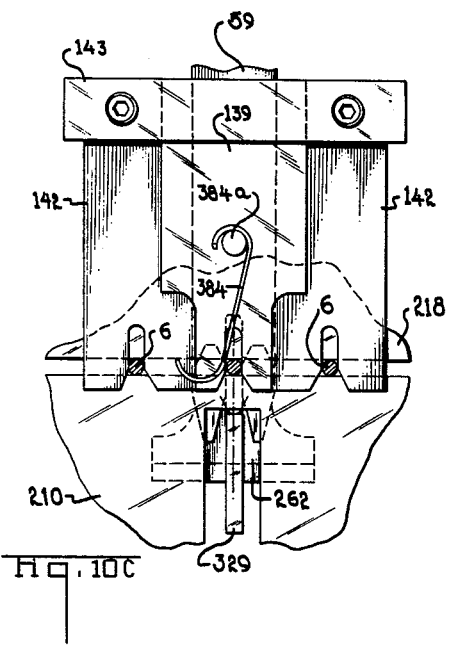
Figure 10D:
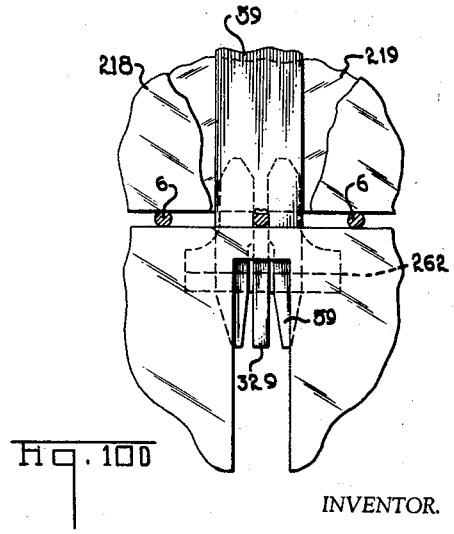

FIGURES 10-A to 10-D are fragmentary views showing the terminal feed fingers and the crimping dies and illustrating the manner in which the belted material is fed and lowered for the crimping operation;

FIGURES 11-A to 11-E are fragmentary sectional views showing the action of the crimping dies and the manner in which a fed terminal is severed from the strip;

FIGURES 12 and 13 are perspective and plan views respectively of a section of belted components of the type adapted for use with the disclosed embodiment;

FIGURES 14 and 15 are sectional views taken along the line and looking in the direction of the arrows 14—14 of FIGURE 7 and showing portions of the terminal feed mechanism;

FIGURE 16 is a view taken along the line and looking in the direction of the arrows 16—16 of FIGURE 7;

FIGURE 17 is a side view of a crimping die test of a type usable with the invention and adapted to crimp terminals of the type shown in FIGURES 12 and 13 onto belted components;

FIGURE 18 is a fragmentary view showing an adjusting means for moving the two presses of the preferred embodiment to adjust the apparatus for varying sizes of components;

FIGURE 19 is a perspective view, with some parts broken away, showing a terminal feed mechanism in accordance with the invention;

FIGURE 20 is a view taken along the line and looking in the direction of the arrows 20—20 of FIGURE 7;

FIGURE 21 is a timing diagram showing the movements of several of the parts of the apparatus;

FIGURE 22 is a wiring diagram showing a preferred control system for the apparatus, and FIGURE 23 is a view similar to FIGURE 8 showing the crimping zone on an enlarged scale.

The disclosed apparatus embodiment of our invention is adapted to crimp terminals onto components which are secured together by belting or tape as shown in FIGURES 12 and 13. The components, which are shown as resistors 4 in the drawing, having wires 6, 8 extending axially from each end thereof are taped together in side-by-side parallel relationship by belting 10, 12 which extends along each side of the components. As shown best in FIGURE 12, each of the strips of belting may comprise two strips of tape between which wires 6, 8 extend. Terminals T are crimped onto wires 6, 8 at predetermined positions between the strips of belting and the components 4. FIGURE 13 shows a section of tape having terminals crimped onto the wire 6 and therefore shows the condition of the belted components after passing through one of the crimping stations of the disclosed apparatus, while FIGURE 12 shows the belted components at the completion of the operation and after terminals have been crimped onto both of the wires.

Referring now to FIGURES 1, 2, and 6, the disclosed apparatus is mounted on a table or other suitable surface 14 supported by means of panels 16. An electric motor (not specifically shown) is mounted beneath surface 14 and provides a pulley which is coupled by means of a belt 18 to a pulley 20 keyed to the end of a main power shaft 22. The main power shaft is supported in suitable bearings provided in housings 24, 24' adjacent each end and has keyed thereto worm gears 26, 26' within these housings. Worm wheels 28, 28' which mesh with worm gears 26, 26' are keyed to cam shafts 30, 30' which extend across surface 14 at right angles to power shaft 22.

Each of the cam shafts 30, 30' has associated therewith the several mechanisms for feeding the belted components, for positioning each component, for feeding terminals, for raising and lowering the belted components, and for crimping the terminals. One of these sets of mechanisms crimps a terminal onto one of the wires extending from each component while the other mechanism subsequently crimps a terminal onto the other one of the wires. Since the two sets of mechanisms are substantially alike, only one of these will be described in detail and the same reference numerals will be used to indicate corresponding parts of the two sets of mechanisms 32, 32'. In the description which follows, only the mechanisms 32 (FIGURE 1) will be described in detail and specific reference will be made to the mechanisms 32', the corresponding parts of which are indicated by corresponding primed reference numerals, where necessary.

Referring now to FIGURES 2 and 3, each mechanism provides a frame or housing having side plates 34 which are cut away as shown in 33 to permit passage of the belt of components, a base plate 35 (FIGURE 6), an upper front plate 36 secured to side plates 34, a lower front plate 37, and back plates 38, 41. Portions of front plate 37 and back plate 41 extend transversely beyond side plate 34 and provide bearing supports for cam shaft 30 as shown in FIGURE 2.

A shaft 40 extending through the top portion of the housing is supported in bearings 42 which in turn are carried by a sleeve 44 secured to front plate 36 and back plate 38. A sprocket 46 mounted on the end of shaft 40 is coupled by means of a chain 48 to a sprocket 50 on cam shaft 30. The front end of shaft 40 as viewed in FIGURE 2, has keyed thereto an eccentric 52 which is rotatably received within the circular bearing portion 54 of a connecting rod having a stud 56 extending from the end thereof connected by means of a ball and socket joint 58 to a reciprocating ram 60 which carries a movable crimping die 59 described below. Adjustable guide blocks or gibs 62 (FIGURE 5) are secured to plate 36 on each side of ram 60, and blocks 63 are secured to plate 36 on each side of these guide blocks. Advantageously adjusting screws 65 extend through blocks 63 to permit accurate adjustment of the guide blocks to compensate for wear of the ram.

Sprocket 50 is of the same diameter as sprocket 46 and it will therefore be apparent that for each revolution of cam shaft 30, press shaft 40 is rotated through one revolution and the ram 60 reciprocates through a single complete cycle. During each cycle the belted components are fed a distance equal to the spacing between adjacent components or the pitch of the belt in a manner described below.

Referring again to FIGURE 1, the belted components are supplied to the apparatus from a supply reel 64 which is mounted for rotation on a stationary shaft 66 carried by a bracket 68 bolted to an apron extending from surface 14. The belted components are fed across the upper surface of table 14 and accurately positioned at each of the crimping stations of the two sets of mechanisms 32, 32' and are delivered to a take-up reel 72 which is mounted as by keying on a shaft 74 carried by brackets 76. A pulley 78 secured on an end of shaft 74 is connected by means of a belt 80 to a pulley 82 (FIGURE 6) secured to a shaft 84 carried by suitable bearings mounted on a cross piece 86 which extends between panels 16 of the table. Shaft 84 provides a sprocket 87 around which a chain 88 extends to a sprocket 90 mounted on cam shaft 30'. Advantageously a slip clutch 74a is provided on shaft 74 to compensate for the changing effective diameter of the reeled belting as reel 74 becomes full. Thus a positive drive for winding up the belted components which have had terminals crimped thereto is provided but the belted components must be pulled off of the supply reel 64 which is not positively driven.

As shown best in FIGURES 2 and 5, the belted components are pulled from the supply reel 64 by means of a pair of sprockets 92 which provide teeth adapted to extend between the fires of adjacent components and over which the belting extends as shown in FIGURE 5. Sprockets 92 are keyed to a shaft 54 (FIGURE 4) mounted in bearings provided in a suitable housing 96 and having a spur gear 98 on the end thereof which meshes with a spur gear 100 on a stub shaft 101 which extends from a bracket 99 affixed to side plate 34. A sprocket 102 also mounted on shaft 101 is connected by means of a chain 104 to a sprocket on a shaft 105 which extends through a speed reducer in a housing 107 to a sprocket 106 coupled by means of a chain 108 to a sprocket 110 mounted on shaft 40 adjacent previously mentioned sprocket 46. During the continuous operation of the machine, sprockets 92 are continuously and slowly rotated to pull the belting from supply reel 64 and to maintain a slack portion in the belting at the point before it enters the crimping and associated mechanisms 32. As explained below, it is desirable to provide electrical control means to prevent an excessive amount of slack belting building up at a point in front of the sprockets 92.

As shown in FIGURE 5, a hold down device for maintaining the belting against and in engagement with sprocket wheels 92 is provided in the form of a pair of arcuate guides 91 secured to a block 93. The weight of the block forces the arcuate portions of the guides against the belting and thereby forces the belting against the sprocket wheels. Block 93 is mounted for vertical movement by means of a pin-slot connection 95 on a bar 97 which is clamped by a clamping device on bracket 99. By virtue of the clamping arrangement shown, the hold down device can be adjusted to some extent in order to center it properly with reference to the axis of the sprocket wheels.

The mechanism described above for pulling the belting from the supply reel does not position accurately the individual components in the crimping zone and to accomplish this end, each of the mechanisms 32, 32′ provides a positive intermittently operated feed means which will now be described.

As shown best in FIGURE 5, a cam 112 is keyed to shaft 40 in front of a retainer plate 53. Cam 112 engages a cam follower 118 carried on one of the arms of a bell crank 114 pivoted to plate 36 at 116. The other arm 117 of the bell crank is connected to a push rod 120 which extends to an arm 122 of another bell crank pivoted at 124 to a stub shaft extending through the left hand one of the guide plates 62 as viewed in FIGURE 5. The remaining arm 126 of this bell crank is pivotally connected to one end of a rod 130 which is pivotally connected at its opposite end 132 to a pin extending from a generally open framework having side members 134 and end members 138. This open frame is suspended by means of straps 136 which are secured by means of bolts and lock nuts 137 to side members 34. It is desirable to provide slots for the bolts in the suspension system in order that the frame may be moved upwardly for servicing the other components of the apparatus. A spring 140 extends from a pin on the right hand one of the guide blocks 62 as viewed in FIGURE 5 to arm 126 of the bell crank pivoted at 124 and tends to bias the open frame 134, 138 rightwardly as viewed in FIGURE 5.

The front side piece 134 of the open frame as viewed in FIGURES 5, 19 and 10-A-10-D has secured thereto a plate 143 from which depend feed fingers 142 which are slotted as shown at 142a. A T-shaped member 139 of plastic or other suitable dielectric material is secured to plate 134 and is also slotted at 139a. As best shown in FIGURES 10-A-10-D, slot 139a receives the wire which in a particular cycle is to have a terminal crimped thereto and moves this wire and its resistor up to the crimping station between upper die 59 and the lower die while slots 142a receive the wires from adjacent resistors. It is desirable to provide multiple slots for several wires as shown and distribute the pulling forces on the belt in order to avoid unduly high stressing and possible bending of any one of the wires. Also, multiple slots prevent misfeeding if a single component is missing from the belt. T-shaped member 139 is of dielectric as previously mentioned and contains an electrical contacting element 384 to sense the presence of the wire as described below. Contacting element 384, which forms part of a control circuit described below, is a section of fine wires supported by a fastener 384a and is pushed aside when a wire is in place. The rear sidepiece 134 of the open frame also carries depending fingers 145 which are in alignment with the feed fingers on the front sidepiece. The fingers on the rear sidepiece do not include T-shaped dielectric member corresponding to the member 139 since it is necessary to contact electrically only one of the wires 6, 8 to which a terminal is to be crimped.

Oscillating motion is imparted to the open frame and the fingers by means of cam 112 and the linkage 117, 120, 122 described above. The belting itself is lowered and raised during select portions of the operating cycle to bring the components in the area of the crimping zone into engagement with the fingers during the feeding stroke of frame 134, 138 and to lower a wire from a positioned resistor onto the lower crimping die at the time of crimping. The mechanism for raising and lowering the belting will now be described.

Referring now to FIGURES 7, 8, 9, and 20, cam shaft 30 has mounted thereon by means of clamps 147 a pair of cams 141, 143 which are engaged by cam followers carried on the ends of arms 146, 148. Arms 146, 148 extend from hubs 146a, 148a mounted for oscillation on a stationary shaft 152 which extends parallel to cam shaft 30 and is carried by the extensions of the plates 37, 41. Hubs 146a and 148a are adjustably secured by means of bolts 151, and slots 149 to a central hub 150 from which extends an arm 154 through an opening 156 in side plate 34. Arm 154 is pivotally connected at its end to a push rod 158, this push rod in turn being pivotally connected at its opposite end 160 to a stud 162 (FIGURES 8 and 9). This stud extends through a slide member 164 and through an opening 206 in lower front plate 37. The slide member is reciprocably mounted between guides or gibs 166 on rear side of plate 37 and disposed between side plates 34. An arm 168 which projects from the top portion of slide 164 has an enlarged end portion 165 to which is secured by means of bolts 172 the sides 170 of an open frame having a central open portion 174 and a top plate 176 secured to sides 170 by bolts 177. An arm 178 has an end portion 179 slidably received between guides 180 bolted to top plate 176. End portion 179 is adjustably secured to top plate 176 by means of a clamping plate 184 and a locking cam 188. Plate 184 rocks on a stud 186 which extends from top plate 176 through a slot in end portion 179. When cam 188 is in the position of FIGURE 9, plate 184 presses end portion 179 against the top plate and locks it.

The end of arm 178 adjacent the crimping zone is bifurcated as shown at 192 (FIGURE 7) and an upper guide bar 194 is fastened to these extensions 192 as shown best in FIGURES 7, 8 and 23. This guide bar extends horizontally in the orientation shown and in cooperation with a lower guide bar 200, guides the belted component on one side and lowers and raises it. The lower guide bar 200 is secured on the ends of arms 198 of an L-shaped member 196 which is secured to the underside of arm 178 by bolts 195.

As previously mentioned stud 162 extends through an opening in plate 37 and within this opening provides a stop member 208 which limits the vertical reciprocatory motion of the slide assembly. The end of stud 162 is secured to a slide plate or shear plate 210 (see also FIGURE 19) having a slot 212 therein through which terminals are fed. The upper portion of plate 210 has extensions 214 on each side thereof and a pair of U-shaped members 216 have one of their legs secured to this upper portion of the plate. An upper guide bar 218 is carried by the upper legs of U-shaped members 216 so that the upper portion of plate 210 and the bar 218 guide the belting in the same manner as the guide bars 194, 200. Advantageously, upper guide bar 218 carries an additional bar 219 which is spaced from bar 218 by means of spacers 217. As best shown in FIGURES 8 and 9, upper crimping die 59 extends between the spaced bars 218, 219 so that the two bars function to dislodge the terminal from the upper crimping die as the die ascends after completion of the crimping operation.

In normal operation of the apparatus, the components are initially positioned as shown in FIGURE 8 with their wires extending between the guide bars 194, 200 and between the guide bars 214, 218, 219. During operation, the belt is maintained in the elevated position of FIGURE 8 during the feeding portion of each cycle, the actual feeding of the belt being accomplished during movement of feed fingers 142 leftwardly in FIGURE 5, such leftward movement of the fingers being controlled by cam 112 on shaft 40. At the conclusion of the feeding portion of the cycle, the belt is lowered from the position of FIGURE 8 to the position of FIGURE 9, such lowering of the belt being accomplished by cam 143 which rocks arm 148 thereby lowering push rod 158 and lowering slide member 164. The slide member in turn carries downwardly both of the sets of guide bars 194, 200 and 218, 214. At the conclusion of the crimping portion of the cycle, the slide member 164 is raised by cam 141 as it oscillates hub 150 in the opposite direction on shaft 152. It might be added that it is desirable to provide the two cams 141, 143, rather than a single cam, to achieve lowering and raising of slide 164, in order to assure positive operation of the mechanism. While the belt is in its lowered position, the feed fingers return rightwardly in FIGURE 5 and when the belt is raised, it is positioned such that the fingers extend between the wire leads on several adjacent components.

It is desirable under many circumstances that the terminals T be positioned accurately on the leads 6 and 8 with reference to the bodies of the components 4 since it is often required that a specific length of wire be provided between the terminal and the body of the component, particularly where the component is to be used in a fairly crowded circuit as on a printed circuit board. Our preferred embodiment provides means for aligning accurately each component prior to crimping with reference to the crimping dies so that such accurate positioning of the terminals will be achieved. The aligning means (FIGURES 7, 8, 9 and 20) is actuated once during each cycle by a cam 220 on shaft 30 which engages a cam follower 222 (FIGURE 2) on one end of a lever 224 which is pivoted intermediate its ends at 226 to a bracket extending from plate 34. The opposite end of lever 224 is connected to a push rod 227 which is pivotally connected at its opposite end at 228 to an arm extending from a hub 230 (FIGURES 7 and 16) keyed or otherwise secured to a shaft 232. A reduced diameter portion of hub 230 is rotatably supported in a sleeve bearing 234. This sleeve and the shaft extend through an opening in plate 34 and the sleeve bearing is supported by an annular flange 235 which is secured to a plate 236 which plate is bolted as at 237 to a fixed arm 238. Arm 238 extends from front plate 37 and is secured thereto by bolts 240. The end of arm 238 has secured thereto a plate 239 and on the upper surfaces of plates 236, 239 guide rails 248 are mounted. A slide member 246 is received between guides for reciprocatory motion and has a rack bar 244 on its underside which meshes with a spur gear 242 keyed to shaft 232. A rod 250 is threadedly received by a cap member 251 bolted to slide member 246 and extends through the back plate of the press housing. Intermediate its ends this rod provides a clamp which receives the ends of a slidable member 254 which extends towards the crimping zone through a channel in cap member 251 as viewed in FIGURE 9. This clamp includes a spring 255, an abutment 252 and a nut 256. A pusher plate 260 (FIGURE 23) is mounted on the end of member 254 adjacent the crimping zone so that as cam shaft 30 rotates and lever 224 is rocked by this cam shaft, gear 242 is oscillated with shaft 232 and the plate 260 is moved towards and away from the crimping zone. The movement of this plate 260 toward the crimping zone takes place after lowering of the belt of components and prior to crimping so that a component lowered from the position of FIGURE 8 to the position of FIGURE 9 is pushed leftwardly in FIGURE 9 until it abuts an adjustably fixed plate 262. This fixed plate is provided on the end of a bearing plate 264 which in turn is secured to a block 266 supported on arm 238 from which a rod 268 extends rearwardly through the press housing and through an opening in block 246 to a knob 272. Cap screws 264a extend through a slot in slidable member 254 and guide this member on its path. The position of fixed plate 262 can be adjusted by rotation of knob 272 to accommodate a range of component sizes and to regulate the distance between the component and the terminals on the wires extending from the ends thereof. In like manner, rotation of knob 258 adjusts plate 254 and plate 260 relative to block 246 so that the position of this plate can be regulated for the size of the component.

The terminal feed mechanism which will now be described is mounted upon an L-shaped carrier 290 (FIGURES 8, 9, and 19) which reciprocates vertically towards and away from the crimping zone along a path determined by guide blocks 292 secured to lower front plate 37. Periodic reciprocation of carrier 290 is achieved by means of a cam set 274, 276, FIGURES 5 and 7, keyed or otherwise secured to shaft 30 which engages cam followers on arms extending from hubs 278, 279 mounted on stationary shaft 152. Hubs 278, 279 are adjustably secured to a central hub 281 in the manner previously described with reference to hubs 146a, 148a, 150. An arm 280 extends from hub 281 on the opposite side from cams 274, 276 and is pivotally connected to a push rod 286 which in turn is pivotally connected at 288 to the L-shaped feed mechanism carrier 290. As is the case with the belt raising and lowering mechanism, a pair of cams 274, 276 are provided for raising and lowering the terminal feed mechanism carrier in order to assure positive motion of this part in timed sequence with the terminal feeding operation and the crimping operation.

The terminal feed mechanism itself comprises a pneumatic cylinder 294 mounted on carrier 290 which is connected to a suitable source of compressed air (not shown) and which is actuated by a pair of microswitches 293, 295 (FIGURE 1) which control the action of a solenoid valve shown in the wiring diagram, FIGURE 22. Cylinder 294 is provided with an internal spring which normally maintains it in the position shown in FIGURE 9 so that when microswitch 293 is closed, compressed air is admitted to the lower end of this cylinder to cause piston rod 296 to move upwardly. This piston rod is connected by means of a link 297 to a bell crank pivoted at 298 to carrier 290. The remaining arm 300 of this bell crank is connected by means of a link 302 to a slide member 304 (FIGURES 14 and 15) having a boss depending therefrom. A rod 306 extends from this boss into a suitable opening in the horizontal arm 305 of carrier 290. An extension 305a on the end of arm 305 has an opening therein which receives the end of rod 306 and a stop nut thereon which limits movement of the slide member thereby to limit movement of the terminal strip during the feeding operation.

Slide member 304 is guided for reciprocatory movement between guides 308 and carries a pair of pivotally mounted fingers 310 which are normally biased by means of a spring 312 towards each other (FIGURES 14 and 15). A feed track 309 is secured to arm 305 and extends toward the crimping dies. A drag plate 316 provides a projection 318 which extends towards the feed track and normally maintains the strip of terminals resiliently against the feed track. As shown best in FIGURES 14 and 15 the feed track extends over slide member 304 although the track itself does not move with the slide member. Drag plate 316 is pivoted to a bell crank 320 which in turn is pivoted to a block 322 and has a spring 324 extending from one arm thereof to a bracket 326 extending from block 322.

Terminals are supplied from a reel 327 mounted for rotation on a shaft 325 carried by a bracket 331 which in turn is secured to the side of table 14. The terminal strip thus extends across surface 14 towards the feed mechanism and to track 309. A microswitch 330 supported on a bracket 328 provides a contact 332 in extension 305a which engages the strip and permits operation of the apparatus only when a supply of terminals is available for feeding towards the crimping zone. It will be apparent from FIGURES 8, 9, and 19 that as piston rod 296 swings bell crank 298 about its pivot point the slide member is moved rightwardly in FIGURE 9 carrying with it the spring biased fingers which in turn grip and deliver a terminal through slot 212 to the lower crimping die 329 carried by front plate 37. Terminal feed takes place when the parts are in the position of FIGURE 8, that is when the carrier 290 is in its elevated position. Subsequently, carrier 290 moves downwardly and slide member 210 also moves downwardly however, as best shown in FIGURES 11–a–11–e, the slide member overtakes the terminal feed mechanism carrier 290 during such downward movement and initially severs the fed terminal from the strip of terminals at the interface between the fixed crimping die 329 and the slide member 210. Upon further downward movement of both the terminal feed carrier 290 and the slide member 210, the slide member further overtakes the carrier and the slug is severed from the leading terminal of the strip at the interface between the slide member and a shearing blade 291. This slug falls downwardly as shown in FIGURE 11–e and may be disposed of through an exit chute not specifically shown.

The various simultaneous and overlapping operations which take place during a single operating cycle of the apparatus can best be understood from the timing diagram of FIGURE 21 which relates all of the operations to a single rotation of cam shaft 30 and assumes as a starting point the position of this cam shaft when the ram 60 is at its top dead center position. At the start of the cycle, a previously fed terminal is located on lower crimping die 329 and the terminal feed mechanism, carried by L-shaped carrier 290, is in the raised or "up" position. The fed terminal will not have been severed from the strip of terminals but will be joined to the strip extending through slot 212. Also at the start of the cycle the component aligner 260 will be in the "retracted" position (FIGURE 8) and the belt will be undergoing feeding by feed fingers 142, 143, 145.

During about the first 60° of the rotation of shaft 30 feeding of the belted components continues by leftward movement in FIGURE 5 of the feed fingers. The feed fingers then dwell for an interval during which the belt is depressed by downward movement of the belt depressor mechanism comprising the guide bars 194, 200, 214 and 218 and their associated structure. As the belt is depressed, one of the wires extending from the resistor is lowered into a previously positioned terminal as illustrated in FIGURES 11–A to 11–E. During the interval when the belt is lowered, the terminal feed mechanism is also lowered and the fed terminal is severed from the strip as shown in FIGURE 11–C. As the ram descends during this same interval the severed terminal is gripped between the two parallel sides 394 (FIGURE 17) of crimping die 59 to prevent its turning or rolling relative to the wire. As downward movement of the ram continues, the terminal sidewalls are bent inwardly by the tapering sides 396 of the die and finally are curled towards each other by the reversely curved die portions 398 when the ram bottoms. Prior to bottoming of the ram and crimping die, the component aligner moves rapidly forward toward the crimping zone and retracts accurately to position the component with reference to the crimping die so that the terminal will be crimped onto the wire at the desired position. Also prior to bottoming of the ram, the slug which remains after the leading terminal is severed from the strip is cut (FIGURE 11–E) as the terminal feed mechanism continues to move downwardly. While the belt is depressed and the terminal is being crimped, open frame 134, 136 which carries the feed fingers moves rightwardly as viewed in FIGURE 5 and dwells.

After the ram begins its ascent, the belt is raised and brought into contact with the feed fingers and during about the final 60° of rotation of the cam shaft the belt is fed to position the next adjacent terminal between the crimping dies. It will be noted that the actual feeding of the belt and the movement of the feed fingers encompasses the top dead center position of the ram and takes place during an interval of about 120°. The terminal feed mechanism is raised after bottoming of the ram, and after it reaches its elevated position of FIGURE 8, the next adjacent terminal is fed onto the lower crimping die. By this time the belt will have been raised and does not interfere with the terminal feed operation.

As previously mentioned, it is desirable to provide means for adjusting the machine for different sizes of components and different lengths of wire or widths of belt. Such adjusting means is shown in FIGURE 18 which shows the underside of surface 14. As is apparent from FIGURE 18, each of the press housings is mounted on a bed plate 35 having a pin 36 extending through a slot 338 in surface 14. Bed plate 35 is confined between guide ways 334, 333 for sliding motion towards and away from the path of belt feed. Simultaneous adjustment of both presses is achieved by means of links 340, 340' which connect pins 336, 336' with a lever 344 pivoted at 346 to a boss 348 mounted centrally between the two mechanisms 32, 32'. Lever 344 is pivotally connected at one end 350 to a link 352 which in turn is pivoted to an arm 354 extending from a shaft 356 on a gear train contained in housing 358. A shaft 359 on the other end of this gear train provides a hand wheel 360 accessible from one side of the apparatus as shown best in FIGURE 1. It will be noted that pivot points 342, 342' are equal distant from central pivot 346 so that as hand wheel 360 is rotated, the two mechanisms 32, 32' are moved simultaneously towards and away from the path of belt feed.

During such motion of course cam shaft 30, 30' must also move by the same amount as the associated housings 32, 32'. To this end each of the cam shafts has a splined coupling 361 adjacent main power shaft 22 which permits such motion of the cam shafts. As shown best in FIGURE 6, locking means comprising locking bolts 363 extend through the bed plates of the two mechanisms 32, 32' and are provided with locking nuts 364 on their ends.

Referring now to FIGURE 22, in one wiring arrangement for the apparatus power is supplied from a 115 v. source through a master switch 366, through conductors 367, 369 to a magnetic starter 368 for the motor M. The magnetic starter is connected by means of conductors 370, 371, 374 to a pair of "start, stop, jog" switches 372, 372' which are located on opposite sides of the machine, these switches being wired in a manner such that the operation of the entire machine can be controlled from either station. The wiring between these switches is not specifically shown in as much as it involves only known principles. However, it should be noted that conductor 374, which connects one of the switches to the magnetic starter connects in series switches 330, 330' and 376, 376'. Switches 330, 330' are normally open but are mechanically closed by the strip of terminals T (see FIGURE 9) so that the machine is stopped if the supply of terminals becomes exhausted at either crimping station. Switch 376 (FIGURE 5) is controlled by a lever 375 which is contacted by the belt as it leaves sprockets 92 and controls the amount of slack in the belt. If the slack belting as shown in FIGURE 5 becomes too great, lever 375 opens microswitch 376 thus stopping the machine. Switch 376' performs a somewhat similar function with regard to the belting leaving the machine and being wound on take-up reel 72. At the exit side of the machine, slack as shown in FIGURE 5 should also be provided. If the belt becomes overly taut, switch 376' is opened.

A control system 378 for the terminal feed mechanisms comprises a transformer 379 from the low voltage secondary of which extends conductors 392, 394 to duplicate control elements for each terminal feed mechanism. Since the control circuits are alike, only the control circuit indicated by the unprimed reference numerals will be described in detail. Conductor 392 extends to a two-position solenoid 390 from the windings of which extend conductors 391, 393. Each position of the core for solenoid 390 has its own winding so that movement of the core in both directions is positively controlled by energizing one of the windings. Conductor 391 extends to normally open microswitch 293, previously mentioned, which is closed once during each cycle by a cam on shaft 30 (see FIGURE 1). This switch, 293, is connected directly to the transformer secondary by conductors 395 and 394. Conductor 393 extends to a microswitch 295, also actuated by a cam on shaft 30, and this latter switch is in turn connected by a conductor 383 to a switch 386 which in turn is connected to conductor 394 by means of a conductor 396.

Solenoid 390 controls an air valve (not specifically shown) which governs the admission of air to cylinder 294. The switch 293 is closed, air is exhausted from this cylinder and the feed mechanism retracts. When switch 295 is closed, if switch 386 is closed as described below, air is admitted to the cylinder and the feed mechanism advances a terminal. Cams 299 and 297 on shaft 30 are so timed as to close switches 293 and 295 at the appropriate times during the crimping cycle.

It is desirable to avoid feeding a terminal to the crimping dies unless a component wire is properly positioned to receive it, since the loose terminal may become lodged in and jam the tooling. Our preferred embodiment obviates this problem in the provision of terminal feed control circuit indicated generally at 382. This circuit is supplied by conductors 380, 381 and includes a low voltage (shock free) feeler switch 384 (see FIGURE 10-A) which is closed during the belt feeding portion of the cycle by the wire which, later in the same cycle and at the conclusion of the belt feeding step, will be positioned at the crimping station to receive the terminal which is fed and crimped. Upon closure of feeler switch 384, switch 386 is automatically closed thus to permit feeding of a terminal when cam 299 closes microswitch 295. If, for example, the belt is imperfect and one or more components are not properly positioned so as to be located between the crimping dies, feeler switch 384 will not be closed and a terminal will not be fed.

The closing of switch 386 upon closing of switch 384 may be accomplished in a variety of ways and it is not deemed necessary to disclose a specific arrangement. Preferably a vacuum tube circuit is employed, and switch 386 is a relay with contacts in the circuit. The circuit should be extremely sensitive and responsive to very slight pressure in feeler switch 384 since this switch is closed by very fine wires and under very slight pressure.

A salient feature of the control circuit described is that feeler switch 384 is closed during feeding of the belt rather than after the arrival of the component at the crimping station. In other words, feeler switch 384 predicts the arrival of a component at the crimping station in advance of its actual arrival. The prediction of the arrival of the component is advantageous in that a longer time interval is permitted for terminal feed, which is important where the machine is operating at a relatively high speed.

Changes in construction will occur to those skilled in the art and various apparently different modifications and embodiments may be made without departing from the scope of the invention. The matter set forth in the foregoing description and accompanying drawings is offered by way of illustration only. The actual scope of the invention is intended to be defined in the following claims when viewed in their proper perspective against the prior art.

This application is a continuation of our now abandoned application Serial Number 708,602, filed January 13, 1958, for Assembling and Crimping Apparatus and Method.

We claim:

1. Apparatus for crimping terminals in end-to-end strip form onto wires extending from electrical devices such as resistors, said devices being secured together in spaced apart side-by-side relationship, said apparatus being adapted to crimp a terminal onto each of said wires between said device and the end of said wire, said device comprising, a pair of crimping dies movable relatively towards and away from each other, a platform disposed adjacent to said dies and having means for feeding a strip of said terminals towards said dies to position the leading terminal of said strip between said dies, means for moving said dies relatively towards each other, means for moving said platform from said dies along a path extending parallel to the direction of movement of said dies during movement of said dies toward each other thereby to provide clearance for said wire during crimping, a shear plate disposed between said platform and said dies, an opening in said shear plate to permit feeding of said said terminal strip from said platform to a position between said dies, and means for moving said shear plate along a path extending parallel to the direction of movement of said platform thereby to sever said leading terminal from said strip as said platform and said strip move away from said dies.

2. Apparatus for crimping terminals onto wires extending from electrical devices, said devices being taped together in spaced side-by-side relationship, said apparatus comprising a ram, a first crimping die carried by said ram, a second crimping die in opposed relationship to said first crimping die, reciprocable feed finger means for feeding said taped together devices, means responsive to said ram for reciprocating said feed finger means, said feed finger means being engageable with said taped electrical devices during movement of said feed fingers in a first direction whereby said devices are fed past said ram, means responsive to said ram for lowering said taped electrical devices during movement of said fingers in the opposite direction whereby one of said electrical devices is positioned between said dies, and means for feeding a succession of terminals towards said taped devices to a position between said crimping dies whereby upon relative movement of said crimping dies towards each other, the leading terminal is crimped onto the wire extending from said electrical device positioned between said dies.

3. Apparatus for crimping terminals onto wires intermediate their ends, said wires being taped together in side-by-side spaced-apart relationship in the form of a flexible belt, said apparatus comprising, a pair of crimping dies movable relatively towards and away from each other, belt feeding means comprising reciprocable fingers concatenated with said dies for intermittently feeding said belt in a plane extending between said dies whereby said wires extend beyond said dies, terminal feed means reciprocable from a feeding position to a remote position, belt moving means for moving a portion of said belt relatively towards said terminal feed means and one of said crimping dies after feeding of said belt thereby to position a wire in said belt within a terminal disposed between said dies, and means for moving said terminal feeding means along its path of reciprocation away from said belt to said remote position after feeding of each terminal thereby to permit movement of said belt by said belt moving means towards said fed terminal, whereby upon movement of said dies towards each other said terminal is crimped onto said conductor.

4. In a crimping apparatus adapted to crimp terminals onto wires intermediate their ends, said wires being secured together in the form of a flexible belt, said apparatus comprising, a reciprocable ram having a crimping die thereon, belt feed finger means reciprocable in a plane extending substantially normally of the path of reciprocation of said ram, said belt feed finger means being engageable with said belt to feed said belt past said ram as said belt feed finger means moves in a belt feeding direction, a continuously rotating ram shaft, eccentric means connecting said ram shaft and said ram, eccentric cam means on said ram shaft for reciprocating said feed finger means, and means for displacing portions of said belt in a direction extending substantially normally of its plane and out of engagement with said belt feed finger means at the conclusion of a feeding stroke thereby to permit movement of said belt feed finger means in a direction opposite to said feeding direction.

5. Apparatus as set forth in claim 4 wherein said means for displacing portions of said belt comprises guide means for said belt, said guide means being movable away from said belt feed finger means at the conclusion of a belt feeding stroke.

6. Apparatus as set forth in claim 5 including a continuously rotating cam shaft drivingly coupled to said ram shaft, and cam means on said cam shaft for moving said belt guide means.

References Cited in the file of this patent

UNITED STATES PATENTS

| | | |
|---|---|---|
| 2,867,262 | Ainsworth et al. | Jan. 6, 1959 |
| 2,897,870 | Berg | Aug. 4, 1959 |